(12) United States Patent
Gray

(10) Patent No.: US 9,289,339 B2
(45) Date of Patent: Mar. 22, 2016

(54) PERSONAL MOBILITY VEHICLE

(75) Inventor: Ian Gray, Devon (GB)

(73) Assignee: ROLLERSCOOT LTD., Devon (GB)

( * ) Notice: Subject to any disclaimer, the term of this patent is extended or adjusted under 35 U.S.C. 154(b) by 0 days.

(21) Appl. No.: 14/383,129

(22) PCT Filed: Mar. 9, 2012

(86) PCT No.: PCT/GB2012/000227
§ 371 (c)(1),
(2), (4) Date: Sep. 5, 2014

(87) PCT Pub. No.: WO2013/132201
PCT Pub. Date: Sep. 12, 2013

(65) Prior Publication Data
US 2015/0008050 A1    Jan. 8, 2015

(51) Int. Cl.
| | |
|---|---|
| *B62D 6/00* | (2006.01) |
| *A61G 5/12* | (2006.01) |
| *B62K 3/00* | (2006.01) |
| *B62K 5/025* | (2013.01) |
| *B62D 51/02* | (2006.01) |
| *B62J 9/00* | (2006.01) |
| *B62K 5/007* | (2013.01) |
| *A61G 5/10* | (2006.01) |

(52) U.S. Cl.
CPC *A61G 5/12* (2013.01); *B62D 51/02* (2013.01); *B62J 9/003* (2013.01); *B62K 3/002* (2013.01); *B62K 5/007* (2013.01); *B62K 5/025* (2013.01); *A61G 2005/1051* (2013.01); *A61G 2005/124* (2013.01)

(58) Field of Classification Search
CPC ......... B62D 51/02; B62J 9/003; B62K 5/007; A61G 2005/124; A61G 7/1096; A61G 5/12; A61G 5/14
See application file for complete search history.

(56) References Cited

U.S. PATENT DOCUMENTS

| | | | | |
|---|---|---|---|---|
| 4,802,542 | A * | 2/1989 | Houston ................ | A61G 5/14 180/65.51 |
| 4,809,804 | A * | 3/1989 | Houston et al. ........... | 180/65.51 |
| 5,168,947 | A * | 12/1992 | Rodenborn ................ | 180/19.1 |
| 5,265,689 | A | 11/1993 | Kauffmann | |
| 5,520,402 | A * | 5/1996 | Nestor ..................... | A61G 5/00 280/250 |
| 5,884,935 | A * | 3/1999 | Tholkes ...................... | 280/657 |
| 5,892,180 | A * | 4/1999 | Carey ........................ | 177/144 |
| 6,053,519 | A * | 4/2000 | Poindexter et al. ........ | 280/250.1 |
| 6,099,002 | A * | 8/2000 | Uchiyama ................ | 280/87.021 |
| 6,371,228 | B1 * | 4/2002 | Husted et al. ............ | 180/65.1 |
| 6,446,742 | B1 * | 9/2002 | Wilson ..................... | 180/65.6 |
| 7,392,554 | B1 * | 7/2008 | Su et al. ..................... | 5/86.1 |
| 7,740,099 | B2 * | 6/2010 | Field ..................... | A63C 17/01 180/282 |
| 9,050,225 | B2 * | 6/2015 | Ooka ........................ | B62J 1/28 |

(Continued)

FOREIGN PATENT DOCUMENTS

| | | | |
|---|---|---|---|
| DE | 200 19 844 U1 | 2/2001 | |
| GB | 2346361 A * | 8/2000 | |
| WO | WO 9611658 A1 * | 4/1996 | ............... A61G 5/14 |

*Primary Examiner* — Joseph Rocca
*Assistant Examiner* — Conan Duda
(74) *Attorney, Agent, or Firm* — Ware, Fressola, Maguire & Barber LLP

(57) ABSTRACT

A personal mobility vehicle comprising a platform (10) on which a user of the vehicle can stand, ground-engaging wheels (14, 15, 16) on which the platform (10) is supported, motor drive means, motor control means (20), a column (11) extending upwards from the platform (10) and a leg or thigh support rest (18) mounted on the column.

1 Claim, 3 Drawing Sheets

(56) References Cited

U.S. PATENT DOCUMENTS

| | | |
|---|---|---|
| 2003/0141120 A1 | 7/2003 | Esposito |
| 2005/0283906 A1* | 12/2005 | Summers ..................... 5/86.1 |
| 2006/0097557 A1* | 5/2006 | Tholkes et al. ............... 297/330 |
| 2009/0119835 A1* | 5/2009 | Liljedahl ..................... 5/87.1 |
| 2009/0165203 A1* | 7/2009 | Biersteker et al. ............ 5/83.1 |
| 2009/0186747 A1* | 7/2009 | Lokken et al. ................ 482/51 |
| 2010/0031439 A1* | 2/2010 | Spidare et al. ................ 5/87.1 |
| 2010/0084831 A1* | 4/2010 | Wang ............................ 280/39 |
| 2012/0104711 A1* | 5/2012 | Alexander .................. 280/47.34 |
| 2012/0133113 A1* | 5/2012 | Takamoto et al. ............ 280/657 |
| 2012/0255118 A1* | 10/2012 | Hammond et al. ............. 5/86.1 |
| 2015/0164717 A1* | 6/2015 | Lee ....................... A61G 5/041 701/22 |
| 2015/0190293 A1* | 7/2015 | Hacikadiroglu ..... A61G 7/1017 5/87.1 |

\* cited by examiner

PERSONAL MOBILITY VEHICLE

CROSS REFERENCE TO RELATED APPLICATIONS

This application is the U.S. National Stage of International Application Number PCT/GB2012/000227 filed on Mar. 9, 2012, which application is hereby incorporated by reference in its entirety.

FIELD OF THE INVENTION

This invention relates to personal mobility vehicles.

With an increasingly elderly population in this country there is a growing requirement for safe, reliable and versatile personal mobility vehicles, particularly for use by those who are disabled or less able, and it is an object of the present invention to meet this requirement.

SUMMARY OF THE INVENTION

According to the present invention there is provided a personal mobility vehicle comprising a platform on which a user of the vehicle can stand, ground-engaging wheels on which the platform is supported, drive means for driving at least some of the wheels, a column extending upwards from the platform, a body-stabilizing support rest mounted above the platform, and means for steering the vehicle comprising handles positioned so that a user standing on the platform and leaning against the body-stabilizing support rest can readily grasp the handles.

The body stabilizing support rest is preferably a thigh support rest mounted on the column, but may be a leg rest.

The thigh support rest is preferably so positioned that, when the user leans forward against the thigh support rest, the user tends to pull back on the handles thereby effectively neutralizing any shift in the centre of gravity of the user and giving the user an improved sense of stability while driving the vehicle. This improved sense of stability enhances the confidence of the user and this improvement in confidence can be of significant benefit.

The thigh support rest is preferably angled and shaped so as to be complementary to the user's thighs and may be covered in a foam-like material to assist comfort and stability. The thigh support rest may be adjustable in height and inclination. A variety of sizes of columns and associated parts may be provided.

The support rest may be used as a perching stool, but a fold-down seat may be attached to the vehicle, for example, to the column, so as to allow the user to rest between journeys and possibly during journeys.

A basket or other carrying device is preferably mounted on the top of the column with the thigh support rest carried by the rearwardly facing surface of the basket or other device and with the handles provided at the top of the basket or other device. The handles may alternatively be provided in front of the basket, either side of the basket, or quite separate from the basket.

The basket or other carrying device is preferably adjustably mounted on the column for movement between a normal or operational position and a storage or transport position. The basket or other carrying device may be a traditional wire basket, a bucket, a bag, a utility box or the like. It may, for example, take the form of a bag attached, for example, to the rear or the front of the column, underneath the thigh rest or between the column and the thigh rest.

The column is preferably pivotally mounted on the platform for movement between an operational position in which it extends upwardly from the platform and a storage or transport position in which it is folded against the platform.

A joystick may be attached to the column, for example, within the basket or other carrying device.

A variety of methods of folding and unfolding the column may be provided. For example, the column may be folded downwardly to meet the platform such that the vehicle is essentially flat in profile, the column and/or the platform may fold in the middle or may fold with a scissors action.

Another method of folding and unfolding includes arranging for the sides of the column to unfold so as to rest against the platform to give more stability for the column so as to reduce any potential unwanted forward and backward rocking movement, with the sides being arranged to fold inwards when it is desired to fold the column down against the platform.

One or more electric motors may be provided for effecting the folding and unfolding operations, with operation of the motor(s) controlled by means of a push-button control means.

The ground-engaging wheels may comprise a pair of castor wheels at the front of the platform and a pair of driven wheels at the rear of the platform. The ground-engaging wheels may alternatively be a pair of driven wheels at the front of the platform and a pair of castor wheels at the rear of the platform. As a further alternative, a four-wheel drive system may be provided, which would also facilitate steering of the vehicle.

The wheels, particularly the castor wheels, may be recessed under the platform to maintain a low platform profile and a low centre of gravity whilst maintaining freedom of movement of the wheels.

Two idler wheels may also be provided at the front and/or the rear of the platform to prevent tipping of the vehicle when, for example, it is being driven over uneven ground or an incline or over ramps.

Idler wheels may alternatively (or additionally) be provided on the sides of the platform to prevent unwanted sideways movement or to ensure that the vehicle always has four wheels in contact with the ground.

DESCRIPTION OF THE PREFERRED EMBODIMENT

Figure 1:
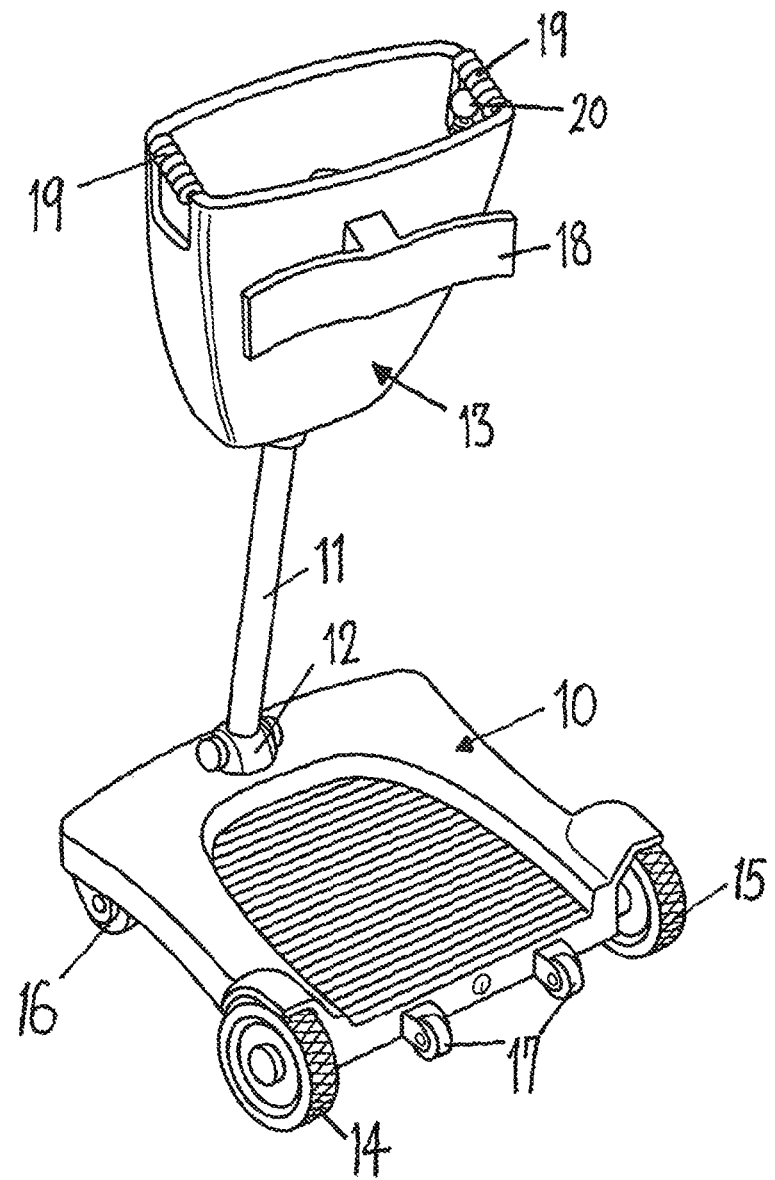
FIG. 1 is a perspective view of an example of a personal mobility vehicle in accordance with the present invention in its operational condition.

The personal mobility vehicle shown in the drawings includes a platform 10 on which the user of the vehicle can stand and a column 11 pivotally mounted on the platform 10 adjacent the centre of the front end thereof. The pivot mounting 12 for the column 11 is such that the column 11 can be moved relative to the platform 10 between the normal operational condition shown in FIG. 1 and the storage or transport condition shown in FIGS. 2 and 3. When in the normal operational condition, the column 11 is fixed against movement relative to the platform 10 but a release mechanism is provided so that, on actuation thereof, the column 11 can be pivoted into the position shown in FIGS. 2 and 3.

Figure 2:
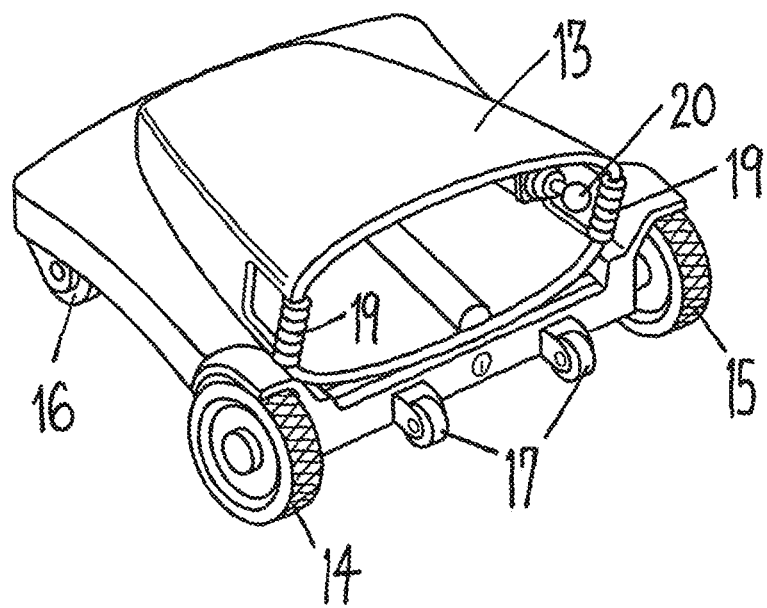
FIGS. 2 and 3 are perspective views of the personal mobility vehicle in its storage or transport condition.
Figure 3:
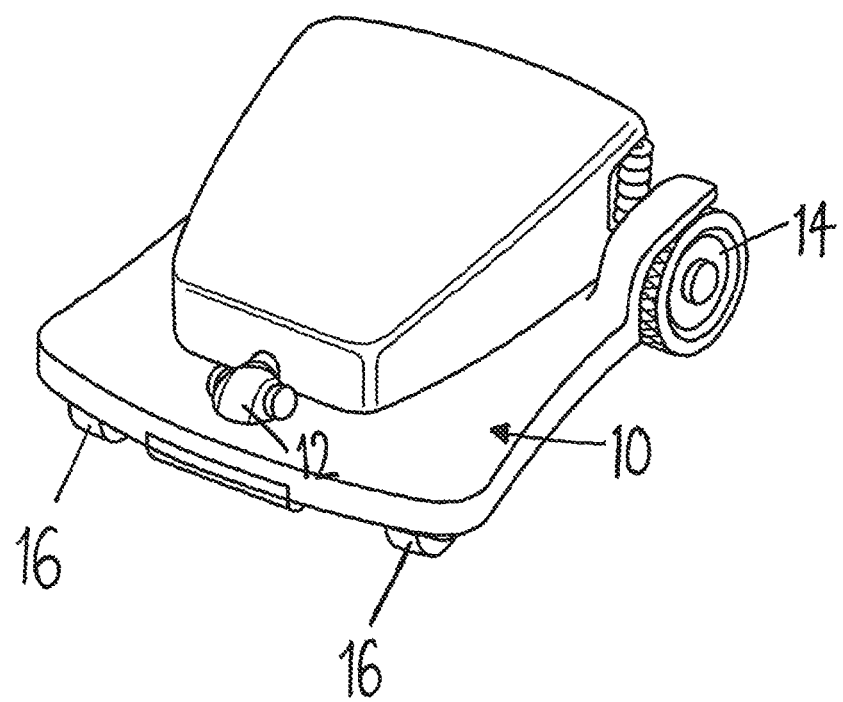

A basket 13 is mounted telescopically on the column 11 and is movable between the position shown in FIG. 1, in which it is at the top of the column 11, and the position shown in FIGS. 2 and 3, in which the majority of the column 11 is contained within the basket 13. When the basket 13 is in the normal operational condition as shown in FIG. 1, the basket 13 is fixed against movement relative to the platform 10 but a release mechanism is provided so that, on actuation thereof, the basket 13 can be pivoted into the position shown in FIGS. 2 and 3.

Two independently driven ground-engaging drive wheels 14 and 15 are located at the rear of the platform 10 and there are two ground-engaging castor wheels 16 at the front of the platform 10. There is also a pair of idler wheels 17 at the rear of the platform 10.

A thigh support rest 18 is attached to the rearwardly facing wall of the basket 13 and is so positioned that, when the user standing on the platform 10 leans forward during normal travelling movement, he or she has his or her thighs resting against the support rest 18. Handles 19 are provided at the top of the basket 13 on either side thereof and the arrangement is such that, when controlling operation of the vehicle and leaning against the support rest 18, the user tends to pull back on the handles 19 thereby effectively neutralizing any shift in the centre of gravity of the user and giving the user an improved sense of stability while driving the vehicle. This improved sense of stability enhances the confidence of the user and this improvement in confidence can be of significant benefit.

A control element having a knob 20 at its upper end is contained within the basket 13 adjacent to one of the handles 19 so as to be operable by the user of the vehicle in a manner corresponding to operation of a joystick so as to effect controlled operation of the driven wheels 14 and 15 so as to effect movement of the vehicle forwardly or rearwardly as well as turning thereof in any required direction. The control element is not necessarily contained within the basket 13, but can be located at any position in which it is readily accessible by a person standing on the platform 10.

As shown in FIG. 1, the thigh support rest 18 is angled and shaped so as to be complementary to the user's thighs and can be covered in a foam-like material to assist comfort and stability. The thigh support rest 18 can be adjustable in height and inclination.

As can be seen from the figures of the drawings, the vehicle is readily convertible from its operating condition shown in FIG. 1 into its storage or transport condition shown in FIGS. 2 and 3.

As can be seen from FIG. 1, the standing area on the platform 10 is lower than the mid-wheel or axle height and this increases the stability of the vehicle.

As the thigh support rest 18 is adjustable in both height and angle, it can be so positioned to be used as a lean-to support rest or perching stool of sorts whilst the mobility vehicle is not actually being driven.

Driving of the driven wheels 14 and 15 is preferably effected by means of hub-drive motors, typically being powered by lithium-Ion batteries, although a conventional motor-gearbox and lead-acid battery arrangement is, of course, possible.

The battery pack can be so mounted that it is quickly and easily replaced with another, and this can be of either the same amperage or of a different amperage depending on the situation.

The mobility vehicle is easily attendant-controlled, in contrast with other personal mobility vehicles, and it can quickly and easily be stood on its rear end for resting during transportation (using the front retractable handle and the rear wheels) and for ease of storage. The component parts of the mobility vehicle can be detached from each other, especially the basket 13, the platform 10 and the battery pack, and transported separately. The handles 19 or the column 11 may be used for pulling the mobility vehicle into a desired position for, for example, folding and storage or transport.

An important advantage of the personal mobility vehicle of the present invention is that it allows the user to maintain a standing position so he or she is at the same height as most able-bodied people. This in itself helps to reduce the feeling of inferiority that many users experience and to remove the stigma attached to other mobility vehicles which, in turn, helps with the confidence of the users. It should also be noted that this can be a contributing factor to encourage the use of this particular personal mobility vehicle and can only be good for those who have previously refused to use a mobility vehicle in the past due to similar negative opinions.

Also, many disabled and elderly people have great difficulty sitting for long periods of time and then rising from a sitting position or vice versa. With the personal mobility vehicle of the present invention, people will be encouraged to remain more active as it will be easier to mount and dismount the mobility vehicle.

As mentioned above, another feature of the vehicle of the present invention is that it is very easy for an attendant to control. The steering controls are at a convenient height and can be controlled with one hand. This is in contrast to many other mobility vehicles which can be very difficult, if not impossible, for an attendant to control.

The vehicle of the present invention is environmentally friendly.

The rear of the basket 13 (the face thereof nearer to the user) could actually double up as the thigh support rest and, in this case, would be moulded and constructed in such a way to be as effective as a separate thigh support rest.

The top of the basket 13, including the handles 19, could be of a delta shape. The basket 13 could be a one-piece injection-moulded component, as could the platform 10. Components of the mobility vehicle could alternatively be made of an aluminium alloy.

The batteries can be of any sort and size, and mounted at any convenient position on the vehicle. The personal mobility vehicle may have different interchangeable battery packs, each one of which can be used according to the intended usage. The batteries can be detachable for charging or transportation. As the battery pack is likely to be relatively small and light, a power inverter connected to a 12v socket could be utilized, e.g. in a car or motor home. A single 12v battery could be used or two 12v batteries connected in series to give 24v.

As shown in FIG. 1, the platform 10 includes a standing area for the feet which is slightly sunken and may have a covering formed of a non-slip material or a moulded non-slip texture. A suspension system could also be incorporated in the mobility vehicle.

When the user of the vehicle is standing on the platform 10, the joystick control knob 20 is so positioned that the operating hand of the user is in a comfortable, neutral and natural position, allowing the operating hand to be in an almost vertical position. The palms of the user can rest comfortably on the handles 19, with the fingers and thumb of the relevant hand free to operate the joystick control knob 20. The joystick control can be positioned so as to be operated by either the left or right hand and the handles 19 are adjustable so as to give the desired position and angle.

By utilizing a joystick type of controller, the need for a traditional steering tiller is eliminated. This also greatly increases the stability of the mobility vehicle as the centre of gravity remains within the platform 10 dimensions and, in turn, virtually eliminates the risk of the vehicle tipping whilst turning. Due to the nature of the design, construction and controller programming of the vehicle, the personal mobility vehicle according to the present invention slows down automatically when turning, further adding to its stability and increasing the confidence of the user. Also, maneuverability is greatly increased due to the enhanced turning ability of the mobility vehicle.

The personal mobility vehicle according to the present invention preferably includes braking means. This can be incorporated into at least one of the driven wheels 14 and 15 or the motors. It may take the form of an electromagnetic type of brake acting on at least one of the driven wheels 14 and 15 or the motors. Alternatively, the braking means may be actuated in some other way.

The battery pack can be releasably attached to the front of the platform 10. There may be a retractable handle located over the front of the battery pack which is flush with the front edge of the platform 10 when it is fully engaged and helps to protect and secure the battery pack. When the handle is fully extended, it allows the battery pack to be released and also serves as a convenient handle for transporting the personal mobility vehicle or for pulling it along on the rear idler wheels 17.

As can be seen from the drawings, the personal mobility vehicle according to the present invention is much more compact than other personal mobility vehicles, especially in the storage or transport form shown in FIGS. 2 and 3. This compact size allows it to include, or to be conveniently stored in, a suitable case or storage bag, which may itself incorporate a carry handle and wheels for ease of transportation.

Safety of personal mobility vehicles is a very important issue. As users of the personal mobility vehicle according to the present invention are in a generally standing position and, therefore, higher and more visible than in or on other personal mobility vehicles, they will be able to see better and thus be more aware of their surroundings. They will also be seen by others more easily.

Possible Features of the Vehicle that can be Used to Promote its Use

Exceptionally stable
Extremely maneuverable
Folding column
Folds as one piece
Folds down into its own base dimensions
Folds as a pod or case
Single operation column lowering and folding
Single handed folding possible.
Single handed steering
Twin motors operate each rear wheel individually
Multidirectional steering
Turns within its own radius
Lightweight
Standing—so same height as able-bodied people
Reduces stigma attached to other mobility vehicles
Height, forwards and backwards adjustable column
Adjustable handle angle
Low cost production
No seat, therefore smaller, lighter and easier to fold, lift, manoeuvre, transport and store
Compact
Collapsible
Standing upright
Centre of gravity remains central
Easy to operate
Small batteries
Aluminium base, chassis and tiller possible
Lithium-ion or lead acid batteries
Short charge time
Could utilize power inverter in a motor vehicle 12v socket
Column very stable
Hands at natural and neutral position relaxed
Wide enough to increase stability even more
Arthritic friendly grips
Joystick positioned for ideal comfort—minimal hand/finger movement required as almost vertical
Possibility of multidirectional handle-type joystick for steering
Platform small and lightweight but stable and strong
Standing area for feet with non-slip material or mouldings
Steering using twin potentiometer joystick easy to operate single-handed, arthritis friendly
No tiller steering so no loss of stability
Front castors don't cause lateral friction which would shift centre of gravity thereby reducing stability
Turning sharply—no shift in centre of gravity to outside area of platform as the mobility vehicle slows automatically due to programming and opposite-turning motors and wheels during steering
Rear wheel drive so good traction
Tyres can have radial grooves and be sectioned to increase frictional contact with ground and also means small wheels can be used which increases torque from motors
Front castors positioned for maximum ease of turning, support and stability
Less weight on front of platform than rear enabling castors to turn freely and without 'lag' felt in other personal mobility vehicles when changing direction
Motor axles positioned behind feet to further increase stability
One or more component parts, e.g. battery pack, etc could be detachable
Single operation to lower and fold down
Lever with hydraulic damper mechanism preferred
Interdisplaceable tubing then release damper mechanism to fold column flat against platform
Alternatively, traditional hinges, pins, C-clips, toothed joint brackets, etc could be used
Non-folding version an option
Thigh support rest can be used as a lean-to support rest when mobility vehicle is not actually being operated
Basket box positioned in between handles adjacent thigh support rest to maintain center of gravity and stability
No tiller steering so no shift of centre of gravity or loss of stability
Twin motors operate each rear wheel individually giving multidirectional steering
Smaller motors
Convenience
Equivalent to, and as stable as, standing with support from walking aids plus added support from the thigh support rest.

The invention claimed is:

1. A personal mobility vehicle comprising:
a platform on which a user of the vehicle can stand, said platform having a front end and a rear end,
an upwardly extending column pivotally mounted on the platform adjacent the front end thereof,
ground-engaging wheels on which the platform is supported, said ground-engaging wheels including a pair of independently driven wheels at the rear end of the platform,
a basket mounted telescopically on the column, a body-stabilizing thigh support rest attached to the rearwardly facing surface of the basket, a pair of handles provided at the top of the basket and positioned so that they can be grasped by the user of the mobility vehicle when the user is leaning forward against the thigh support rest, and a control element having a knob at its upper end positioned adjacent to one of the handles and operable by the user of the vehicle to effect controlled operation of the rear wheels.

* * * * *